United States Patent
Okita et al.

(10) Patent No.: US 10,328,518 B2
(45) Date of Patent: Jun. 25, 2019

(54) RESISTANCE SPOT WELDING METHOD

(71) Applicant: JFE STEEL CORPORATION, Tokyo (JP)

(72) Inventors: Yasuaki Okita, Tokyo (JP); Chikaumi Sawanishi, Tokyo (JP); Rinsei Ikeda, Tokyo (JP); Kenji Oi, Tokyo (JP)

(73) Assignee: JFE STEEL CORPORATION, Tokyo (JP)

(*) Notice: Subject to any disclaimer, the term of this patent is extended or adjusted under 35 U.S.C. 154(b) by 424 days.

(21) Appl. No.: 14/770,592

(22) PCT Filed: Jan. 24, 2014

(86) PCT No.: PCT/JP2014/052180
§ 371 (c)(1),
(2) Date: Aug. 26, 2015

(87) PCT Pub. No.: WO2014/136507
PCT Pub. Date: Sep. 12, 2014

(65) Prior Publication Data
US 2016/0008913 A1    Jan. 14, 2016

(30) Foreign Application Priority Data
Mar. 8, 2013  (JP) .............................. 2013-047180

(51) Int. Cl.
*B23K 11/24* (2006.01)
*B23K 11/11* (2006.01)

(52) U.S. Cl.
CPC ............. *B23K 11/115* (2013.01); *B23K 11/24* (2013.01)

(58) Field of Classification Search
CPC ..... B23K 11/115; B23K 11/24; B23K 11/252; B23K 11/258; B23K 11/257; B23K 11/243; G05B 2219/45135

(Continued)

(56) References Cited

U.S. PATENT DOCUMENTS 2,433,967 A * 1/1948 Van Sciver .......... B23K 11/248
 219/110
6,057,523 A   5/2000 Fujii et al.
(Continued)

FOREIGN PATENT DOCUMENTS

CN    1319473 A    10/2001
JP    H09-216071 A    8/1997
(Continued)

OTHER PUBLICATIONS

English Translation of JP 2010221284 A.*
(Continued)

*Primary Examiner* — Phuong T Nguyen
*Assistant Examiner* — Chris Q Liu
(74) *Attorney, Agent, or Firm* — Oliff PLC

(57) ABSTRACT

A method of resistance spot welding to join a plurality of overlapping metal sheets, including: dividing a current pattern into two or more steps for welding; before actual welding, performing test welding to store, for each step as a target value, a time variation of an instantaneous amount of heat generated per unit volume and a cumulative amount of heat generated per unit volume; and subsequently, as actual welding, starting welding using, as a standard, a time variation curve of the instantaneous amount of heat generated per unit volume obtained by the test welding, and when a time variation amount of an instantaneous amount of heat generated deviates during any step from the time variation curve by a difference, performing adaptive control welding to control a current passage amount in order to compensate for the difference during a remaining welding time in the step.

2 Claims, 4 Drawing Sheets

(58) Field of Classification Search
USPC .................................. 219/86.7, 108–110
See application file for complete search history.

(56) References Cited

U.S. PATENT DOCUMENTS

| | | | | |
|---|---|---|---|---|
| 6,130,396 | A * | 10/2000 | Hasegawa ............ | B23K 11/258 219/110 |
| 2002/0008086 | A1 | 1/2002 | Fujii et al. | |
| 2009/0261076 | A1 * | 10/2009 | Ziegler ................ | B23K 11/066 219/110 |
| 2012/0193330 | A1 * | 8/2012 | Edwards, II ............ | B23K 11/11 219/86.1 |
| 2013/0248505 | A1 * | 9/2013 | Anayama .............. | B23K 11/115 219/130.01 |

FOREIGN PATENT DOCUMENTS

| | | |
|---|---|---|
| JP | H10-94883 A | 4/1998 |
| JP | H11-33743 A | 2/1999 |
| JP | 2001-138064 A | 5/2001 |
| JP | 2010-221284 A | 10/2010 |
| JP | 2010-240740 A | 10/2010 |
| JP | 2010221284 A * | 10/2010 |
| JP | 2010-247215 A | 11/2010 |
| JP | 2012-011434 A | 1/2012 |
| JP | 2012-061487 A | 3/2012 |
| WO | 2012/120351 A1 | 9/2012 |

OTHER PUBLICATIONS

Jul. 20, 2016 Office Action issued in Korean Patent Application No. 10-2015-7026076.
Oct. 24, 2016 Office Action issued in Chinese Patent Application No. 201480012953.8.
May 10, 2016 Extended European Search Report issued in European Patent Application No. 14759633.2.
Mar. 11, 2014 International Search Report issued in International Patent Application No. PCT/JP2014/052180.
Dec. 8, 2015 Office Action issued in Japanese Patent Application No. 2015-504203.
May 22, 2018 Office Action issued in European Patent Application No. 14 759 633.2.

* cited by examiner

Nugget diameter 5.1 mm

Nugget diameter 5.0 mm    1 mm

Nugget diameter 4.0 mm    1 mm

Nugget diameter 5.6 mm  1 mm

RESISTANCE SPOT WELDING METHOD

TECHNICAL FIELD

This disclosure relates to a method of resistance spot welding by multistep current passage in which the current pattern has two or more steps. In particular, this disclosure attempts to form a suitable nugget by utilizing adaptive control welding in each step.

BACKGROUND

Resistance spot welding, which is a type of lap resistance welding, is typically used to join overlapping steel sheets.

This welding method is a method to join two or more overlapping steel sheets by applying a high welding current for a short time between a pair of electrodes squeezing the steel sheets from above and below. A point-like weld is obtained using the resistance heat generated by passing, the high-current wielding current. Such a point-like weld is referred to as a nugget and is the portion where both of the overlapping steel sheets fuse and coagulate at a location of contact between the steel sheets when current is applied to the steel sheets. The steel sheets are joined in a point-like manner by this nugget.

In order to obtain good weld quality, it is important to form the nugget which has an appropriate diameter. The nugget diameter is determined by welding conditions such as the welding current, welding time, electrode shape, electrode force, and the like. Therefore, to form an appropriate nugget diameter, the above welding conditions need to be set appropriately in accordance with the conditions of materials to be welded, such as the material properties, sheet thickness, number of sheets overlapped, and the like.

For example, when manufacturing automobiles, spot welding is performed at several thousand points per automobile, and workpieces that arrive one after another need to be welded. At this time, if the conditions of materials to be welded, such as the material properties, sheet thickness, number of sheets overlapped, and the like are identical, then the same nugget diameter can be obtained under the same welding conditions such as the welding current, welding time, electrode force, and the like. During consecutive welding, however, the surfaces of the electrodes in contact with the materials to be welded gradually wear, so that the contact area gradually expands beyond that of the initial state. If the same welding current as in the initial state is applied after the contact area has thus expanded, the current density in the materials to be welded lowers, and the temperature rise in the weld is reduced. The nugget diameter therefore decreases. Hence, for every several hundred to several thousand spots of welding, the electrodes are either dressed or replaced, so that the electrode tip diameter does not expand excessively.

A resistance welding device provided with a function (stepper function) to increase the welding current after welding a predetermined number of times, so as to compensate for the reduction in current density due to wear of the electrodes, has also been used conventionally. To use that stepper function, the above-described pattern for changing the welding current needs to be set appropriately in advance. Performing tests or the like, however, to derive a pattern for changing the welding current that corresponds to numerous welding conditions and conditions of materials to be welded is highly time-consuming and expensive.

The state of progress of electrode wear also varies during actual work. Therefore, the predetermined pattern for changing the welding current cannot always be considered appropriate.

Furthermore, when there is a disturbance at the time of welding, such as when a point that has already been welded (previously welded point) is located near the point being welded, or when the surface of the materials to be welded is highly uneven and a contact point between the materials to be welded is located near the point being welded, then current diverts to the previously welded point or the contact point. In such a state, the current density is reduced at the position to be welded directly below the electrodes, even when welding under predetermined conditions. A nugget of sufficient diameter therefore cannot be obtained.

In order to compensate for this insufficient amount of heat generated and to obtain a nugget of sufficient diameter, it becomes necessary to set a high welding current in advance.

Techniques such as the following have been proposed to resolve the above problem.

For example, JP H9-216071 A (PTL 1) discloses a control unit of a resistance welder that obtains a set nugget b comparing an estimated temperature distribution of the weld with a target nugget and controlling output of the welder.

JP H10-94883 A (PTL 2) discloses a method of controlling welding conditions of a resistance welder to achieve good welding by detecting the welding current and the voltage between tips, performing a simulation of the weld by heat transfer calculation, and estimating the formation state of the nugget.

Furthermore, JP H11-33743 A (PTL 3) discloses the achievement of a good weld, regardless of the type of materials being welded or the wear state of the electrodes, with a welding system that first uses the sheet thickness of the materials being welded and the welding time to calculate the cumulative amount of heat generated per unit volume that allows for good welding of the materials being welded and then adjusts the welding current or voltage that yields the calculated amount of heat generated per unit volume and unit time.

CITATION LIST

Patent Literature

PTL 1: JP H9-216071 A
PTL 2: JP H10-94883 A
PTL 3: JP H11-33743 A

With the resistance spot welding methods in PTL 1 and PTL 2, however, complicated calculations are necessary in order to estimate the temperature of the nugget based on a heat transfer model (heat transfer simulation) or the like. The structure of the welding control unit not only becomes complicated, but the welding control unit itself also becomes expensive.

The resistance spot welding method recited in PTL 3 always allows for good welding regardless of the degree of electrode wear by controlling the cumulative amount of heat generated to be a target value. When the set conditions of materials to be welded and the actual conditions of materials to be welded greatly differ, however, for example in cases such as when there is a disturbance nearby such as the aforementioned previously welded point, when the time variation pattern of the amount of heat generated changes greatly in a short period of time, or when welding hot-dip galvanized steel sheets with a large coating weight, then adaptive control cannot keep up. In some cases, the necessary nugget diameter is not obtained, or splashing occurs due to excessive heat input.

Furthermore, all of the techniques in PTL 1 to PTL 3 effectively address the change when the electrode tip wears, yet do not at all take into account the case of diversion having a large effect, such as hen the distance from a previously welded point is short. Hence, adaptive control sometimes does not actually work.

It could therefore be helpful to propose a resistance spot welding method that can be applied to resistance spot welding, by multistep current passage, that also effectively addresses wear of the electrode tip and the presence of a disturbance, and that can obtain a good nugget.

SUMMARY

We thus provide:

1. A method of resistance spot welding to join materials to be welded by squeezing the materials between a pair of electrodes and passing current while applying pressure, the materials being a plurality of overlapping metal sheets, the method comprising:

dividing a current pattern into two or more steps for welding;

before actual welding, performing test welding to store, for each step as a target value, a time variation of an instantaneous amount of heat generated per unit volume and a cumulative amount of heat generated per unit volume that are calculated from an electrical property between electrodes when forming an appropriate nugget by passing current with constant current control; and subsequently, as actual welding, starting welding using, as a standard, a time variation curve of instantaneous amount of heat generated per unit volume obtained by the test welding, and when a time variation amount of an instantaneous amount of heat generated deviates during any step from the time variation curve by a difference, performing adaptive control welding to control a current passage amount in order to compensate for the difference during a remaining welding time in the step so as to match a cumulative amount of heat generated in the actual welding to the cumulative amount of heat generated that is determined in advance in the test welding.

2. The method of 1, wherein a timing for dividing into the two or more steps is a point in time at which a weld is formed between the materials to be welded.

Before actual welding, in performing test welding to form an appropriate nugget by passing welding current with constant current control, the current pattern is divided into two or more steps, and in each step, the time variation of the instantaneous amount of heat generated per unit volume and the cumulative amount of heat generated per unit volume are stored as target values, thereby allowing for adaptive control welding in each step during actual welding. Therefore, wear of the electrode tip and the presence of a disturbance can also effectively be addressed, a good nugget can be obtained, and application of adaptive control welding to multistep resistance spot welding that requires multistep current passage becomes possible.

DETAILED DESCRIPTION

Figure 1A:
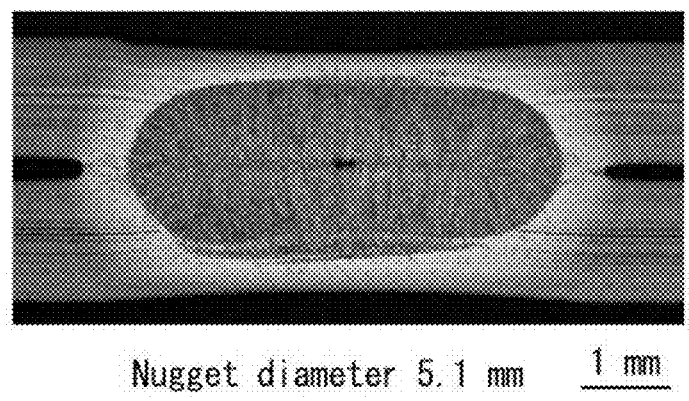
FIG. 1(a) is a weld cross-section when performing test welding.

Our method will be described in detail below.

In our method, resistance spot welding is performed by multistep current passage in which the current pattern is divided into two or more steps, and before actual welding, test welding is performed to store, for each step as target values, a time variation of an instantaneous amount of heat generated per unit volume and a cumulative amount of heat generated per unit volume that are calculated from an electrical property between electrodes when forming an appropriate nugget. Even if the time variation amount of the instantaneous amount of heat generated deviates during any step from the time variation curve that is a standard by a difference, adaptive control welding is then utilized to compensate for the difference during the remaining welding time in the step so as to match a cumulative amount of heat generated in the actual welding to the cumulative amount of heat generated that is determined in advance in the test welding.

First, test welding according to our method will be described. In this example, the case of passing welding current in two steps is described.

A test on the same type of steel and thickness as the materials to be welded is performed by welding under a variety of conditions with constant current control in a state with no gap or diversion to a previously welded point. The welding conditions for obtaining a necessary nugget diameter, i.e. the appropriate electrode force F, welding time T, and welding current I, are thus discovered.

An inverter DC resistance spot welder is preferable as the welder, and chromium copper electrodes with DR-shaped tips may be advantageously adapted for use as the electrodes. Furthermore, the nugget diameter may be determined by a peel test or by cross-sectional observation at the nugget center by etching with a saturated picric acid solution).

Next, the point in time at which a weld is formed between the steel sheets, which are the materials to be welded, may be adopted as the timing for division into steps in the case that the current pattern is divided into two steps. In order to determine this timing, under the same electrode force F and welding current I as above, welding is performed while changing the welding time to discover the point in time at which the weld forms.

Formation of the weld may be confirmed by a peel test.

Assume that the weld forms at welding time $T_1$.

From the above experiment results, the conditions for test welding are determined as follows.

First step welding conditions: electrode force F, welding time $T_1$, welding current I Second step welding conditions: electrode force F, welding time $T_2$ (equal to $T-T_1$), welding current I The time variation of the instantaneous amount of heat generated per unit volume and the cumulative amount of heat generated per unit volume that are calculated from an electrical property between electrodes during welding performed under the above conditions are then stored for each step as target values, completing the test welding.

In this disclosure, the electrical property between electrodes refers to the resistance between electrodes or the voltage between electrodes.

Cooling time may be provided between the first step welding conditions and the second step welding conditions yet is not essential.

Next, the actual welding is performed.

The actual welding is started using, as a standard, a time variation curve of the instantaneous amount of heat generated per unit volume obtained by the test welding, and in each of the steps, when the time variation amount of the instantaneous amount of heat generated follows the time variation curve that is the standard, welding is performed as is to completion.

When the time variation amount of the instantaneous amount of heat generated deviates during any step from the time variation curve that is the standard, however, adaptive control welding is performed to control the current passage amount in response to the difference, thereby compensating during the remaining welding time in the step so as to match a cumulative amount of heat generated in the actual welding to the cumulative amount of heat generated that is determined in advance in the test welding.

In this way, the necessary cumulative amount of heat generated is guaranteed even when the electrode tip wears or when a disturbance is present, thereby yielding an appropriate nugget diameter.

While the method of calculating the amount of heat generated per unit volume is not limited, PTL 3 discloses one example, which is used in this disclosure.

The cumulative amount of heat generated Q per unit volume is calculated with this method as follows.

Let the total thickness of the two materials to be welded be t, the electrical resistivity of the materials to be welded be r, the voltage between electrodes be V, the welding current be I, and the area of contact between the electrodes and the materials to be welded be S. In this case, the welding current passes through a columnar portion with a cross-sectional area S and thickness t, generating resistance heat. The amount of heat generated q per unit volume and unit time in this columnar portion is determined with Equation (1) below.

$$q = (V \cdot I)/(S \cdot t) \qquad \text{Equation (1)}$$

The electrical resistance R of this columnar portion is calculated with Equation (2) below.

$$R = (r \cdot t)/S \qquad \text{Equation (2)}$$

By solving or S in Equation (2) and substituting into Equation (1), the amount of heat generated q is given by Equation (3) below.

$$q = (V \cdot I \cdot R)/(r \cdot t^2) \qquad \text{Equation (3)}$$
$$= (V^2)/(r \cdot t^2)$$

As is clear from Equation (3) above, the amount of heat generated q per unit volume and unit time can be calculated from the voltage between electrodes V, total thickness t of materials being welded, and electrical resistivity r of the materials being welded. Therefore, the amount of heat generated q is not affected by the area S of contact between the electrodes and the materials being welded.

In Equation (3), the amount of heat generated is calculated from the voltage between electrodes V, yet the amount of heat generated q may also be calculated from the current between electrodes I. In this case as well, the area S of contact between the electrodes and the materials being welded need not be used.

Accumulating the amount of heat generated q per unit volume and unit time over the entire welding time period yields the cumulative amount of heat generated Q per unit volume that is added during welding. As is clear from Equation (3), this cumulative amount of heat generated Q per unit volume can also be calculated without using the area S of contact between the electrodes and the materials being welded.

The case of calculating the cumulative amount of heat generated Q using the method disclosed in PTL 3 has been described, yet other methods of calculation may of course be used.

In our method, the current pattern is divided into two or more steps. The following points in time are possibilities as the timing for division into steps.

Division Into Two Steps

The time when the weld forms between steel sheets is preferably used as the dividing point. This is the point between the beginning of weld formation between the steel sheets and the subsequent process of nugget growth.

The reason is that the effect of diversion to a previously welded point is large up to the time a stable current path (weld) is formed directly below the electrodes, and therefore performing adaptive control welding to guarantee the cumulative amount of heat generated per unit volume up until the weld is formed allows for a stable current path to be formed even if a previously welded point is located nearby and allows for stable nugget growth in the subsequent second step.

The timing at which the weld begins to form between the steel sheets can be determined by observation through a peel test, or through cross-sectional observation of the weld, after welding by changing the welding time.

Division into Three Steps

When the materials to be welded are coated steel sheets, three-step division that takes fusion of the coating into account is more preferable. The reason is that when coating is present, there is a large change in the phenomenon up until a stabile current path forms directly below the electrodes, where the effect of diversion is large. Since the melting point of the coating is lower than that of the steel sheets, the coating between the steel sheets first fuses after passage of current begins, and a portion of the fused coating is expelled from between the steel sheets due to the electrode force. The coating that is expelled at this time expands the current conducting area, thereby greatly reducing the resistance between electrodes during welding. Conversely, the specific resistance of the materials to be welded increases along with a rise in temperature. Therefore, the specific resistance increases as the welding time lengthens, and after the decrease in resistance between electrodes due to the expanded current conducting area, an increase in the resistance between electrodes occurs due to the rise in temperature of the materials to be welded. Subsequently, the weld forms. Therefore, dividing the welding process into three steps, i.e. the step in which the coating fuses and the current conducting area expands suddenly, the step up until a stable current path (weld) forms between the electrodes due to subsequent passage of current, and the subsequent nugget formation step, and then performing, in each step, adaptive control welding to guarantee the cumulative amount of heat generated per unit volume allows for a stable current path to be formed by resistance spot welding of coated steel sheets, even if a previously welded point is located nearby. This approach also allows for stable nugget growth in the subsequent third step.

Examples of the disturbance referred to in this disclosure include the above-described presence of a previously welded point near the welding point or contact point between the materials to be welded, as well as wear of the electrodes or the like.

The test welding has been described as being performed in a state without disturbances such as previously welded points. Performing the test welding in a state with a previously welded point, however, poses no problem whatsoever, as doing so reduces the difference between the conditions of test welding and actual welding, thereby facilitating effective performance of adaptive control.

EXAMPLES

Example 1

Mild steel (thickness: 1.6 mm) was prepared as the materials to be welded. The welding current was passed with a two-step current passage method.

Two sheets of the materials to be welded were overlapped and welded with constant current control in a state with no gap or diversion to a previously welded point. The welding conditions for obtaining a suitable nugget diameter were thus obtained. An inverter DC resistance spot welder was used as the welder, and chromium copper electrodes with 6 mm face diameter DR-shaped tips were used as the electrodes. For the welding conditions, an electrode force of 3.43 kN (350 kgf) and as welding time of 16 cyc (50 (hereinafter, time units all refer to the number of cycles at 50 Hz)) were kept constant, and the welding current was changed to a variety of settings to determine the current at which a nugget diameter of $4\sqrt{t}$ (t: sheet thickness) was obtained. In this example, the appropriate nugget diameter is $4\sqrt{t}=5.1$ mm.

As a result, it was found that a nugget diameter of approximately 5.1 mm was obtained with a welding current of 6.2 kA.

Next, in order to determine the timing for dividing the welding process into two steps, welding was performed under the conditions of an electrode force of 3.43 kN (350 kgf) and a welding current of 6.2 kA, while changing the welding time (2, 3, 4, 5, . . . cyc). The timing at which the weld formed between the two steel sheets was then confirmed with a peel test. Under these conditions, it was confirmed that the weld formed at 4 cyc.

From the above experiment results, the conditions for test welding were determined as follows.

First step welding conditions: electrode force, 3.43 kN (350 kgf); welding time, 4 cyc; welding current, 6.2 kA Second step welding conditions: electrode force, 3.43 kN (350 kgf); welding time, 12 cyc; welding current, 62 kA No cooling time was provided between the first step welding conditions and the second step welding conditions.

Welding was performed under the above conditions, and the time variation of the instantaneous amount of heat generated per unit volume and the cumulative amount of heat generated per unit volume that were calculated from the change in voltage and the electrical resistance during welding performed under the above conditions were stored for each step as target values, completing the test welding.

Figure 1B:
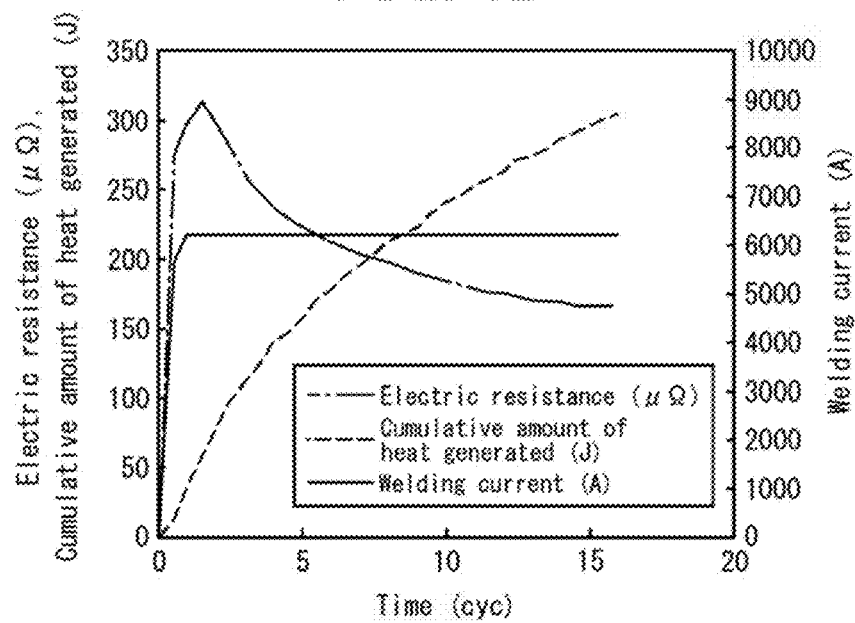
FIG. 1(b) illustrates the corresponding change over time of the welding current, electrical resistance, and cumulative amount of heat generated.

FIG. 1(a) illustrates a weld cross-section when performing this test welding, and FIG. 1(b) illustrates the corresponding change over time of the welding current, electrical resistance, and cumulative amount of heat generated.

As illustrated in FIG. 1(a), in this test welding, a nugget with the target diameter of 5.1 mm was obtained.

The target cumulative amount of heat generated that was obtained in the test welding was 138 J for the first step and 167 J for the second step. Therefore, the final target cumulative amount of heat generated was 305 J.

Next, the actual welding was performed under the following conditions.

Multistep adaptive control resistance spot welding according to our method was performed with the above test welding as a standard, under the conditions of a previously welded point present near the welding point (distance between centers of points: 7.5 mm) and a large effect of diversion. In other words, resistance spot welding was performed using, as a standard, the time variation curve of the instantaneous amount of heat generated per unit volume obtained by test welding.

Figure 2A:
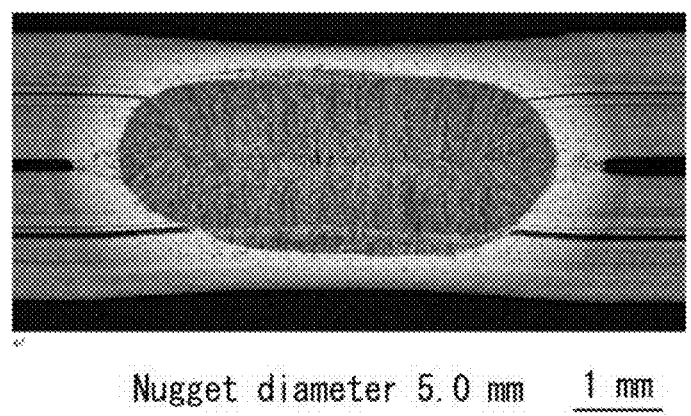
FIG. 2(a) is a weld cross-section when performing two-step adaptive control welding.
Figure 2B:
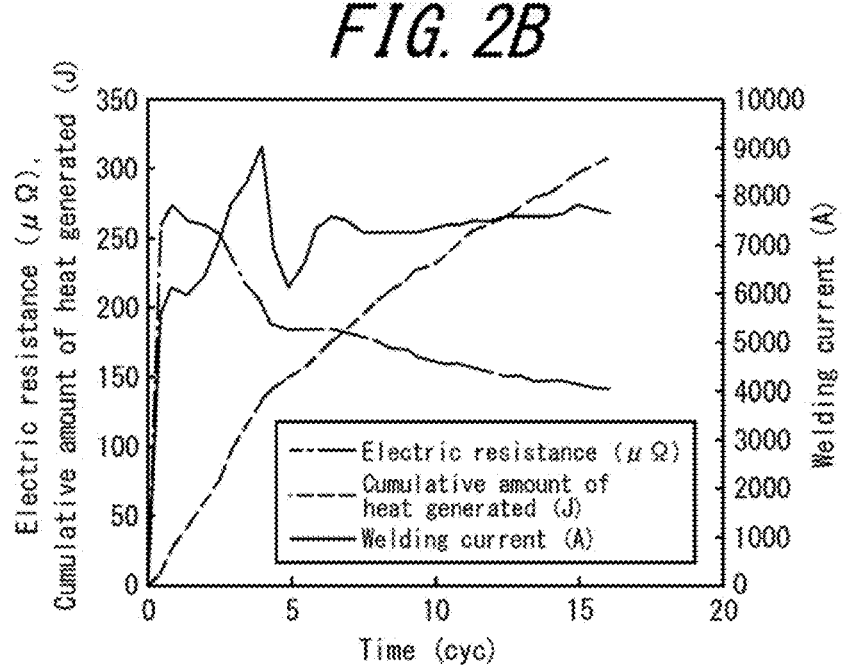
FIG. 2(b) illustrates the corresponding change over time of the welding current, electrical resistance, and cumulative amount of heat generated.

FIG. 2(a) illustrates a weld cross-section at that time, and FIG. 2(b) illustrates the change over time of the welding current, electrical resistance, and cumulative amount of heat generated.

For comparison, resistance spot welding with constant current control (Comparative Example 1) and adaptive control welding with conventional one-step current passage were performed under the condition of a previously welded point present near the welding point (distance between centers of points: 7.5 mm). The constant current control welding was performed under the conditions of an electrode force of 3.43 kN (350 kgf), welding time of 16 cyc, and welding current of 6.2 kA. The adaptive control welding with conventional one-step current passage was performed under the condition of a previously welded point being present while using, as a standard, test welding with one-step current passage performed under the conditions of an electrode force of 3.43 kN (350 kgf), welding time of 16 cyc, welding current of 6.2 kA, and the absence of previously welded points.

Figure 3A:
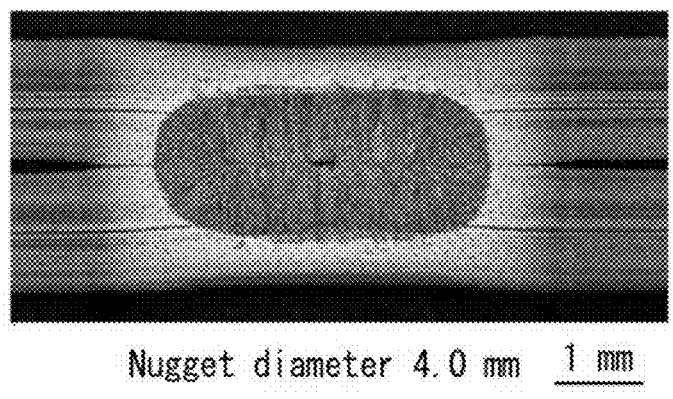
FIG. 3(a) is a weld cross-section when performing conventional constant current control welding.
Figure 3B:
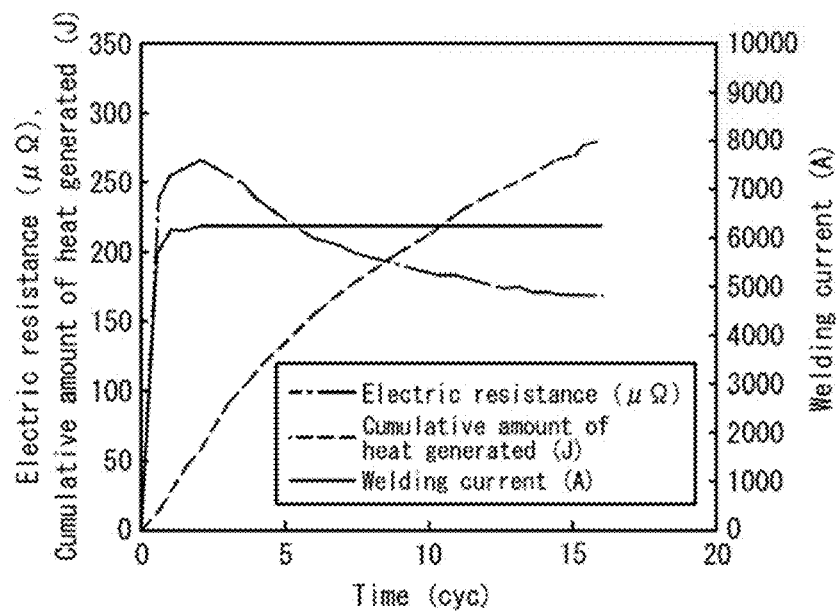
FIG. 3(b) illustrates the corresponding change over time of the welding current, electrical resistance, and cumulative amount of heat generated.

FIG. 3(a) illustrates a weld cross-section when performing constant current control welding, and FIG. 3(b) illustrates the corresponding change over time of the welding current, electrical resistance, and cumulative amount of heat generated.

Figure 4A:
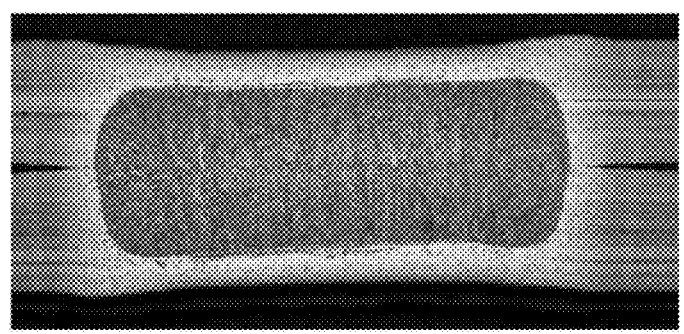
FIG. 4(a) is a weld cross-section when performing conventional one-step adaptive control welding.
Figure 4B:
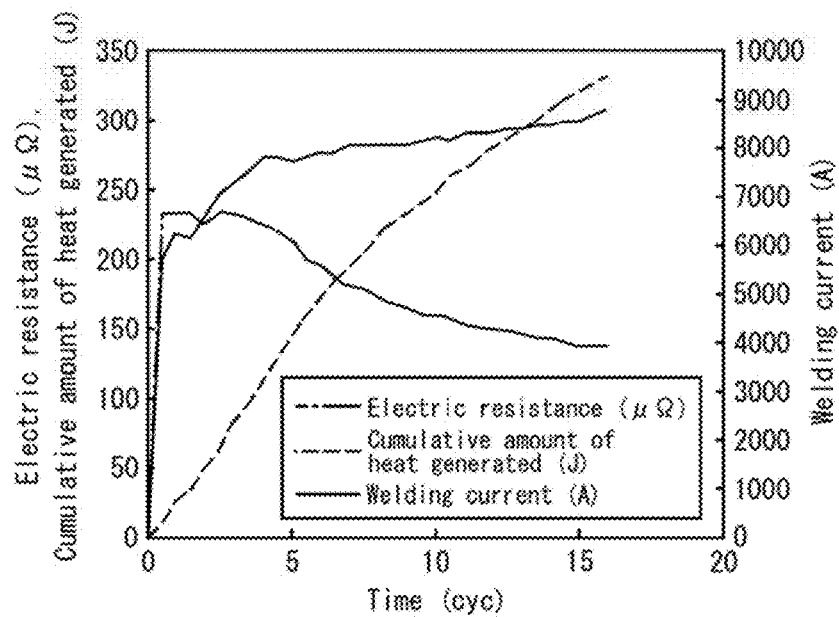
FIG. 4(b) illustrates the corresponding change over time of the welding current, electrical resistance, and cumulative amount of heat generated.

FIG. 4(a) illustrates a weld cross-section when performing adaptive control welding with conventional one-step current, and FIG. 4(b) illustrates the corresponding change over time of the welding current, electrical resistance, and cumulative amount of heat generated.

As is clear from FIG. 2(a), in the case of the Example, the current greatly changed so that the cumulative amount of heat generated became equivalent to the case of the test welding. As a result, the obtained nugget had a nugget diameter of 5.0 mm, nearly the target diameter.

In the Example, in particular in the earlier part of the first step, an insufficient amount of heat generated was observed due to the effect of diversion caused by the previously welded point, yet it is clear that in the latter part of the first step, the welding current was increased to compensate for this insufficiency, thus guaranteeing the target amount of heat generated.

In the actual welding, the cumulative amount of heat generated was 135 J in the first step and 172 J in the second step. The resulting cumulative amount of heat generated of 307 J thus nearly equaled that of the test welding.

Conversely, in the constant current control welding of Comparative Example 1, the total heat input was insufficient due to diversion, and only a nugget with a small diameter of 4.0 mm was obtained.

During the adaptive control welding with conventional one-step current, the current control could not keep pace with the change in the welding phenomenon, and the cumulative amount of heat generated grew larger than that of the test welding. The nugget diameter of 5.6 mm was too large, and a state in which splashing occurred easily was reached.

Next, Table 1 compares the cumulative amount of heat generated in the first step (up to the fourth cycle) for the test welding, two-step adaptive control welding according to our method, conventional constant current control welding, and conventional one-step adaptive control welding.

TABLE 1

|  | Test welding | Example (two-step adaptive control) | Comparative Example 1 (constant current control) | Comparative Example 2 (one-step adaptive control) |
|---|---|---|---|---|
| Cumulative amount of heat generated up to fourth cycle | 138 J | 135 J | 113 J | 113 J |

As indicated in Table 1, in the Example, up to the fourth cycle it was possible to provide a cumulative amount of heat generated equivalent to the cumulative amount of heat generated in the test welding, whereas with the constant current control welding of Comparative Example 1, a reduction in the amount of heat generated due to diversion was observed. It is also clear that in the conventional one-step adaptive control welding, only an amount of heat generated equivalent to that of constant current control welding could be provided, despite performing adaptive control.

The invention claimed is:

1. A method of resistance spot welding to join materials to be welded by squeezing the materials between a pair of electrodes and passing current while applying pressure, the materials being a plurality of overlapping metal sheets, the method comprising:
performing test welding to form an appropriate nugget comprising:
passing welding current with constant current control between electrodes in two or more welding stages,
observing an electrical property between the electrodes,
calculating a time variation of an instantaneous amount of heat generated per unit volume and a cumulative amount of heat generated per unit volume from the electrical property between the electrodes, and
storing as a target value for each stage the time variation of the instantaneous amount of heat generated per unit volume and the cumulative amount of heat generated per unit volume that are calculated from the electrical property between the electrodes;
subsequently, performing actual welding in two or more welding stages corresponding to the two or more stages in the test welding using, as a standard, a time variation curve of the instantaneous amount of heat generated per unit volume obtained by the test welding; and
performing adaptive control welding as a time variation amount of an instantaneous amount of heat generated per unit volume deviates during any stage of the two or more stages in the actual welding from the time variation curve by a difference, the adaptive control welding controlling a current passage amount in order to compensate for the difference during a remaining welding time in the stage so as to match a cumulative amount of heat generated in the actual welding to the cumulative amount of heat generated that is determined in advance in the test welding.

2. The method of claim 1, wherein a timing for dividing into the two or more stages in the test welding is a point in time at which a weld is formed between the materials to be welded.

* * * * *